(12) United States Patent
Wunder et al.

(10) Patent No.: US 11,719,343 B2
(45) Date of Patent: *Aug. 8, 2023

(54) RADIAL SHAFT SEAL

(71) Applicant: KACO GmbH + Co. KG, Kirchardt (DE)

(72) Inventors: Wilhelm Wunder, Beilstein (DE); Konstantin Rempel, Ditzingen (DE)

(73) Assignee: KACO GmbH + Co. KG, Kirchardt (DE)

( * ) Notice: Subject to any disclaimer, the term of this patent is extended or adjusted under 35 U.S.C. 154(b) by 864 days.

This patent is subject to a terminal disclaimer.

(21) Appl. No.: 16/221,528

(22) Filed: Dec. 16, 2018

(65) Prior Publication Data

US 2019/0195365 A1 Jun. 27, 2019

(30) Foreign Application Priority Data

Dec. 22, 2017 (DE) ...................... 10 2017 012 166.4

(51) Int. Cl.
| | |
|---|---|
| *F16J 15/32* | (2016.01) |
| *F16J 15/3208* | (2016.01) |
| *F16J 15/3244* | (2016.01) |
| *F16J 15/3268* | (2016.01) |

(52) U.S. Cl.
CPC ....... *F16J 15/3208* (2013.01); *F16J 15/3244* (2013.01); *F16J 15/3268* (2013.01)

(58) Field of Classification Search
CPC ..... F16J 15/3268; F16J 15/3244; F16J 15/162
See application file for complete search history.

(56) References Cited

U.S. PATENT DOCUMENTS

| | | | | |
|---|---|---|---|---|
| 3,497,225 A | * | 2/1970 | Woodrow | F16J 15/32 277/559 |
| 3,501,155 A | * | 3/1970 | Dega | F16J 15/3244 277/309 |
| 3,504,920 A | * | 4/1970 | Halliday | F16J 15/3244 277/559 |
| 3,515,395 A | * | 6/1970 | Weinand | F16J 15/3244 277/559 |

(Continued)

FOREIGN PATENT DOCUMENTS

DE    10 2017 204 204    9/2018

*Primary Examiner* — Eugene G Byrd
*Assistant Examiner* — L. Susmitha Koneru
(74) *Attorney, Agent, or Firm* — Gudrun E. Huckett (57) ABSTRACT

A radial shaft seal has an elastomeric sealing lip with an inner side facing a shaft to be sealed. The sealing lip has a first circumferential ring arranged at the inner side and resting against the shaft to seal a medium side from an air side. Return conveying elements are arranged circumferentially about the sealing lip at the inner side and at a side of the first circumferential ring facing the air side. They return leakage medium, independent of a rotational direction of the shaft, to the medium side. A second circumferential ring at the inner side is positioned at a side of the return conveying elements facing the air side. The first circumferential ring is an elevation with depressions, also formed as elevations, distributed circumferentially thereabout. The depressions extend toward the second circumferential ring and are positioned, respectively, between two of the return conveying elements neighboring each other.

17 Claims, 4 Drawing Sheets

(56) References Cited

U.S. PATENT DOCUMENTS

| | | | | |
|---|---|---|---|---|
| 3,572,730 A | * | 3/1971 | Otto | F16C 33/585 277/400 |
| 3,586,342 A | * | 6/1971 | Staab | F16J 15/3244 277/559 |
| 3,656,227 A | * | 4/1972 | Weinand | F16J 15/3244 29/530 |
| 3,785,660 A | * | 1/1974 | Bush | F16J 15/3244 277/559 |
| 3,868,105 A | * | 2/1975 | Bentley | F16J 15/3244 277/559 |
| 3,923,315 A | * | 12/1975 | Hadaway | F16J 15/3244 277/559 |
| 3,927,600 A | * | 12/1975 | Peisker | F16J 15/328 409/84 |
| 3,930,655 A | * | 1/1976 | Fern | F16J 15/3244 277/559 |
| 3,934,888 A | * | 1/1976 | Lutz | F16J 15/3244 277/559 |
| 3,984,113 A | * | 10/1976 | Bentley | F16J 15/3244 277/559 |
| 4,052,502 A | * | 10/1977 | Clark | F16J 15/3244 264/293 |
| 4,084,826 A | * | 4/1978 | Vossieck | F16J 15/3244 277/559 |
| 4,174,845 A | * | 11/1979 | Hadaway | F16J 15/3244 277/559 |
| 4,387,902 A | * | 6/1983 | Conover | F16J 15/324 277/560 |
| 4,399,998 A | * | 8/1983 | Otto | F16C 33/7823 277/552 |
| 4,440,405 A | * | 4/1984 | Schaus | F16J 15/3204 277/559 |
| 4,441,722 A | * | 4/1984 | Pichler | F16J 15/3244 277/559 |
| 4,546,985 A | * | 10/1985 | Forch | F16J 15/3244 277/560 |
| 4,635,946 A | * | 1/1987 | Stanley | F16J 15/3244 277/559 |
| 4,671,519 A | * | 6/1987 | Bras | F16J 15/3244 277/559 |
| 4,770,548 A | * | 9/1988 | Otto | B61F 15/22 277/552 |
| 4,783,086 A | * | 11/1988 | Bras | F16J 15/324 277/559 |
| 4,844,480 A | * | 7/1989 | Gralka | F16J 15/164 277/552 |
| 5,002,289 A | * | 3/1991 | Yasui | F16J 15/3244 277/559 |
| 5,511,886 A | * | 4/1996 | Sink | B61F 15/22 277/559 |
| 5,645,283 A | * | 7/1997 | Drucktenhengst | F16J 15/324 277/568 |
| 5,649,710 A | * | 7/1997 | Kanda | F16J 15/3256 277/371 |
| 5,759,466 A | * | 6/1998 | Onuma | F16J 15/3244 264/161 |
| 5,921,555 A | * | 7/1999 | Johnston | F16J 15/3228 277/559 |
| 6,726,211 B1 | * | 4/2004 | Kuroki | F16J 15/3244 277/353 |
| 7,562,878 B2 | * | 7/2009 | Dietle | F16J 15/3208 277/559 |
| 7,891,670 B2 | * | 2/2011 | Alajbegovic | F16J 15/3244 277/559 |
| 7,931,125 B2 | * | 4/2011 | Downes | F16J 15/3252 184/6.18 |
| 8,322,726 B2 | * | 12/2012 | Kurth | F16J 15/3232 277/559 |
| 8,413,995 B2 | * | 4/2013 | Matsui | F16J 15/3244 277/559 |
| 9,309,615 B2 | * | 4/2016 | Heβ | D06F 37/20 |
| 9,353,865 B2 | * | 5/2016 | Lattin | F16N 21/00 |
| 9,447,881 B2 | * | 9/2016 | Tsuji | F16J 15/025 |
| 10,190,637 B2 | * | 1/2019 | Inamasu | F16C 33/726 |
| 10,267,421 B2 | * | 4/2019 | Ohya | F16J 15/3412 |
| 2002/0163138 A1 | * | 11/2002 | Dietle | F16J 15/3244 277/559 |
| 2003/0230852 A1 | * | 12/2003 | Bengoa | F16J 15/3244 277/402 |
| 2007/0057471 A1 | * | 3/2007 | Rentschler | F16J 15/324 277/559 |
| 2007/0069479 A1 | * | 3/2007 | Liao | F16J 15/3256 277/551 |
| 2007/0132194 A1 | * | 6/2007 | Kanda | F16J 15/3244 277/559 |
| 2007/0187905 A1 | * | 8/2007 | Berdichevsky | F16J 15/3244 277/559 |
| 2007/0296153 A1 | * | 12/2007 | Kurth | F16J 15/3232 277/309 |
| 2014/0151967 A1 | * | 6/2014 | Benedix | F16J 15/3244 277/559 |
| 2014/0312571 A1 | * | 10/2014 | Kurth | F16J 15/3244 277/559 |
| 2018/0266563 A1 | | 9/2018 | Kurth | |
| 2019/0277403 A1 | * | 9/2019 | Sakano | F16J 15/3204 |
| 2020/0332898 A1 | * | 10/2020 | Wunder | F16J 15/164 |

\* cited by examiner

RADIAL SHAFT SEAL

BACKGROUND OF THE INVENTION

The invention relates to a radial shaft seal with at least one sealing lip of elastomeric material that, at its inner side which is facing the shaft to be sealed, comprises a first circumferentially extending ring which is seal-tightly contacting the shaft and seals relative to the medium side; further comprises return conveying elements arranged about the circumference of the sealing lip and provided at the side of the first ring facing the air side and conveying leakage medium, independent of the rotational direction of the shaft, to the medium side; and further comprises at least one second circumferentially extending ring provided at the side of the return conveying elements that is facing the air side.

Radial shaft seals in the form of radial shaft seal rings are known (US 2014/0151967) and used for sealing rotating shafts. The sealing lip of the radial shaft seal ring rests under a radial force with the first circumferentially extending ring against the shaft and seals relative to the medium side. Should medium have leaked underneath the first ring, the medium is then returned by the return conveying elements back to the medium side. The return conveying elements are formed by grooves that are alternatingly oppositely slanted relative to the circumferential direction of the sealing lip and arranged at the bottom side of the sealing lip. Depending on the rotational direction of the shaft, the medium that has leaked is returned by the grooves to the first ring and conveyed underneath it. The second ring provides a sealing action against the air side. Such radial shaft seal rings are problematic when the shaft rotates at high rotational speeds. High rotational speeds are to be understood as speeds of at least 10,000 r.p.m (revolutions per minute). At such high rotational speeds, the slanted grooves are not well suited as return conveying elements for a reliable return conveyance of the medium which has leaked underneath the first ring.

The invention has the object to design the radial shaft seal of the aforementioned kind in such a way that it is suitable for high rotational speeds of the shaft to be sealed in both rotational directions.

SUMMARY OF THE INVENTION

In accordance with the invention, this is achieved for a radial shaft seal of the aforementioned kind in accordance with the invention in that the first circumferentially extending ring is embodied as an elevation and comprises, distributed about its circumference, depressions that are also produced by elevations and extend in the direction of the second ring and are positioned approximately between neighboring return conveying elements.

In the radial shaft seal according to the invention, the first circumferentially extending ring is designed as an elevation and is provided with depressions distributed about its circumference which are also embodied as elevations. They extend in the direction toward the second ring and are arranged in the region between neighboring return conveying elements. The depressions extend from the first ring in the direction toward the air side of the radial shaft seal. The depressions ensure that medium which has leaked underneath the first ring is returned in the direction toward the medium side. The first ring with the depressions reduces the disruption of the flow direction of the medium to be sealed. Also, this configuration of the first ring reduces the leakage flow. The depressions also lead to the contact surface being enlarged between the first ring and the shaft in the region of the calculated leakage flow. In this way, it is made more difficult for the medium to be sealed to move via the return conveying elements in the direction toward the air side. The radial shaft seal according to the invention is in particular suitable for such situations of use in which, even at high rotational speeds of the shaft, the medium to be sealed that possibly has leaked underneath the first ring is returned (conveyed back) to the medium side. High rotational speeds are to be understood in this context such that the shaft to be sealed has a rotational speed of at least approximately 10,000 r.p.m. With the radial shaft seal according to the invention, even shafts that operate, for example, at rotational speeds in the range of up to 50,000 r.p.m., can be reliably sealed in both rotational directions. Such specifications are in particular required in the field of electric vehicles in the automotive sector.

For smaller shaft diameters, smaller than approximately 30 mm, preferably smaller than approximately 20 mm, rotational speeds up to 100,000 r.p.m. may occur. Even then the radial shaft seal according to the invention reliably can reliably seal the shafts.

Advantageously, the return conveying elements are embodied symmetrical to their center plane which is positioned in an axial plane of the radial shaft seal. In this way, it is ensured that the medium having leaked underneath the first ring is reliably returned to the medium side in both rotational directions of the shaft.

Advantageously, the depressions adjoin approximately tangentially the first ring. The return conveyance of the medium is favored in an advantageously way thereby.

In order for the medium which has leaked underneath the first ring to be reliably returned to the medium side about the circumference of the sealing lip independent of the rotational direction of the shaft, it is advantageous when the return conveying elements extend ata slant in the circumferential direction of the sealing lip.

It is advantageous when the return conveying elements in themselves are straight.

It is also possible to configure the return conveying elements in a curved shape, for example, in a sickle shape. In this context, the return conveying elements can extend in a curved shape in the direction toward the first ring and can closely contact it. The transition from the return conveying elements into the first ring is approximately tangential in this case. In case of such a configuration of the return conveying elements, a return conveyance of medium, which has leaked through the first ring, to the medium side is reliably possible at high rotational speeds of the shaft.

In an advantageous embodiment, return conveying elements neighboring each other in the circumferential direction of the sealing lip are arranged so as to be oppositely slanted relative to each other. In this way, about the circumference of the sealing lip a proper return conveyance of medium that has possibly leaked through underneath the first ring is achieved in both rotational directions of the shaft.

A return conveyance of the leaked medium to the medium side is in particular ensured when the return conveying elements adjoin the first ring and are preferably monolithically formed together with it.

In order for the medium to be reliably returned to the medium side by the return conveying elements and by the depressions, the return conveying elements and the depressions with their ends adjoin advantageously the first ring approximately at the same level.

The return conveying elements are advantageously arranged such that they are positioned at an acute angle relative to the adjacent region of the first ring.

In this context, the return conveying elements together with the regions of the first ring neighboring them form a pressure chamber, respectively. Upon return conveyance, the medium flows into this pressure chamber which, due to the acute angle at which the return conveying elements are positioned relative to the first ring, tapers in the flow direction of the medium to be returned. In this way, such a pressure is created in the pressure chamber that the medium to be returned flows minimally across the first ring and a return conveying mechanism at a defined location is created.

In an advantageous embodiment, the return conveying elements have a spacing relative to the second ring. In this way, it can be reliably prevented that medium which has leaked underneath the first ring reaches the air side.

A simple configuration results when the return conveying elements provided about the circumference of the sealing lip are of the same length.

However, it is also possible that the return conveying elements have different lengths. This may mean that all return conveying elements are of unequal length. Depending on the application, this may also mean that, for example, only one of these return conveying elements has a length different from the lengths of the other return conveying elements.

A safe sealing action relative to the air side is achieved in an advantageous way when at the sealing lip several second rings are provided which are coaxial to each other and to the first ring.

Advantageously, the second rings are identically embodied.

In order to keep wear minimal at high rotational speed of the shaft, the second ring in axial section has advantageously a curved outer side.

It is advantageous in this context that the second ring is embodied such that in axial section it has an approximately semi-circular cross section.

In a simple embodiment, the second rings are arranged at identical spacing one behind the other.

In a particularly advantageous embodiment, the second ring which is neighboring the first ring has projections which are distributed about its circumference and extend in the direction toward the first ring. Due to the projections, possible leakage flows are returned in a targeted and active way to the return conveying elements.

In order for this return conveying action to be ensured about the circumference of the sealing lip, the projections and the depressions are advantageously alternatingly arranged in the circumferential direction of the sealing lip.

The projections can be designed such that the side wall which is facing the first ring is concavely curved. Advantageously, in this context the projections are symmetrical in relation to their center plane, when projected onto the drawing plane. The medium to be returned is supplied along the curved lateral surface reliably to the return conveying elements.

The free ends of the return conveying elements have advantageously minimal spacing from the projections. Between the return conveying elements and the corresponding side wall of the projections, small return guiding gaps are formed in this way and the medium can be guided through them to the return conveying elements.

The subject matter of the invention results not only from the subject matter of the individual claims but also from all features and specifications disclosed in the drawings and the description. They are, even if they are not subject matter of the claims, considered to be important to the invention inasmuch as, individually or in combination, they are novel relative to the prior art.

Further features of the invention result from the additional claims, the description, and the drawings.

DESCRIPTION OF THE PREFERRED EMBODIMENTS

The radial shaft seal described in the following is embodied as a radial shaft seal ring. The radial shaft seal ring is provided in particular for shafts which in their use are subjected to extreme requirements in relation to high rotational speeds, high circumferential speeds, and changing rotational direction. Such specifications are in particular required by the automotive industry in the field of electric vehicles. In this field, electric motors are used which reach rotational speeds of at least 10,000 r.p.m. In connection with future devices, rotational speeds in the range of 20,000 to 30,000 r.p.m. are desired. When such shafts of such electric motors are drive shafts of gear boxes, the high rotational speeds are required not only in forward drive but also in reverse drive. The radial shaft seal ring described in the following fulfills these requirements.

Figure 2:
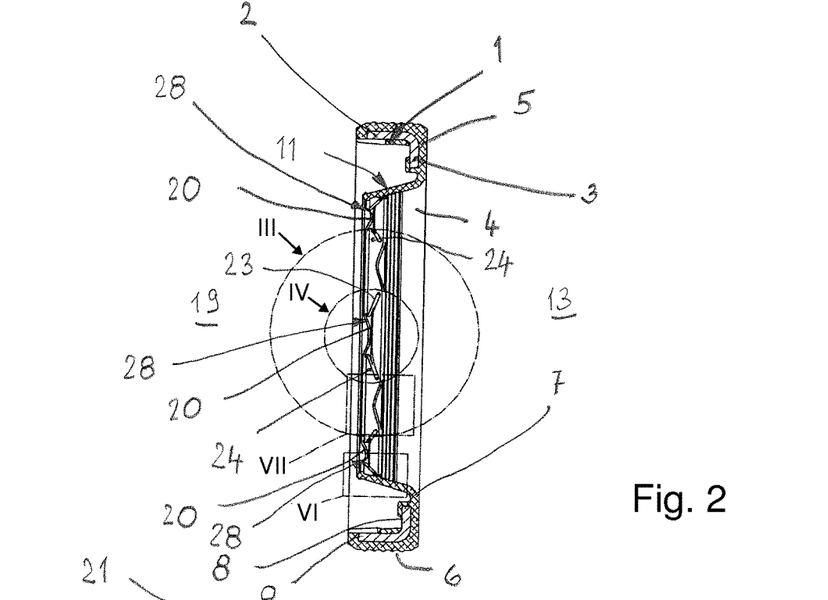
FIG. 2 is a section view along the section line II-II of FIG. 1.
Figure 3:
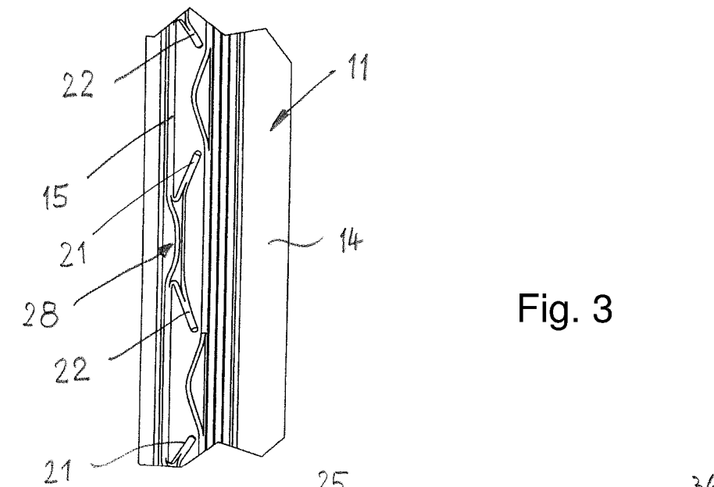
FIG. 3 is a detail illustration of the detail III in FIG. 2.

The radial shaft seal ring has a ring-shaped housing 1 with L-shaped cross section; see FIG. 2. The housing 1 has a cylindrical wall 2 which at one end passes into a radial inwardly oriented housing bottom 3. The housing bottom 3 is centrally provided with a through opening 4 for the shaft to be sealed. The housing 1 can be comprised of metallic material but also of hard plastic material.

The housing bottom 3 is provided at its outer side with a cover 5 which covers also the cylindrical wall 2 at its radial outer side. The part of the cover 5 which is covering the cylindrical wall 2 forms a static seal of the radial shaft seal ring in its installed position. Advantageously, the part of the cover 5 which covers the cylindrical wall 2 is provided with a profiling 6 which projects past the cylindrical wall 2 and upon insertion of the radial shaft seal ring into a receiving chamber is elastically compressed. In this way, a proper static sealing action is ensured. The cylindrical wall 2 of the housing 1 is seated with press fit in the installation chamber for the radial shaft seal.

The cover 5 surrounds also the rim 7 of the through opening 4 and extends across a portion of the inner side 8 of the housing bottom 3. Also, the cover 5 covers advantageously the end face 9 of the cylindrical wall 2.

Figure 1:
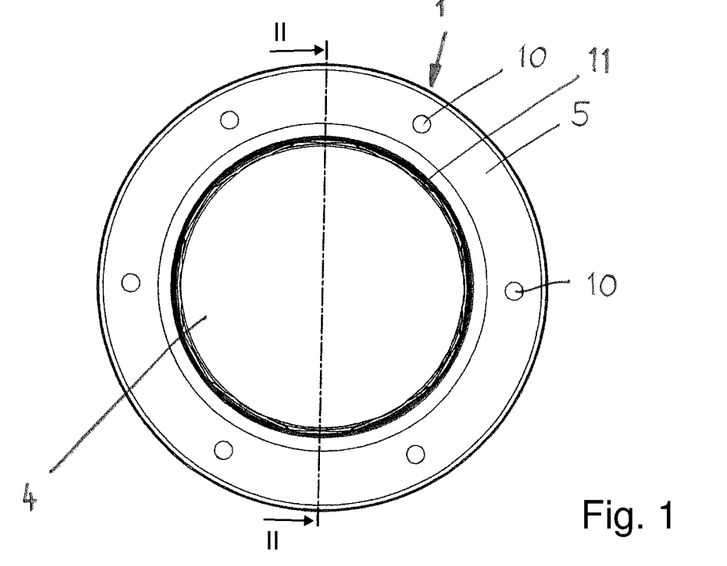
FIG. 1 is a plan view of a radial shaft seal according to the invention.

The cover 5 is connected in a suitable way fixedly to the housing 1, for example, with an appropriate bonding system. For example, the connection can be realized by means of an adhesive. In case of an elastomeric material, the cover 5 can be vulcanized to the housing 1. It is advantageous when the cover 5 is connected additionally with form fit to the housing bottom 3 at the outer side of the housing bottom 3. The housing bottom 3 comprises cutouts 10 at its outer side that are distributed about its circumference; advantageously, the cutouts 10 are distributed along a ring about the circumference of the housing bottom 3 (FIG. 1).

The radial shaft seal ring is provided with a sealing lip 11 which in the installed position is resting with elastic deformation against the shaft to be sealed. The sealing lip 11 is advantageously monolithically formed together with the cover 5. In principle, it is however also possible to provide the cover 5 and the sealing lip 11 as separate parts. This has the advantage that the sealing lip 11 and the cover 5 can then be produced of different materials.

The radial shaft seal ring can be provided with a protective lip which is also advantageously monolithically formed together with the cover 5 and thus also formed together with the sealing lip 11. The protective lip is located at the air side 13 of the radial shaft seal ring and prevents dirt particles and the like from reaching the sealing lip 11.

In the installed position, the sealing lip 11 rests with elastic deformation areally against the rotating shaft. In order to keep the friction and thus wear as minimal as possible, the surface pressure or the specific radial force at which the sealing lip 11 bears against the shaft is very minimal and is, for example, within a range of magnitude of approximately 0.01 N/mm to 0.1 N/mm. The inner side 14 of the sealing lip 11 which is facing the shaft to be sealed is provided with a structure which will be explained in detail with the aid of FIGS. 3 to 8.

Figure 6:
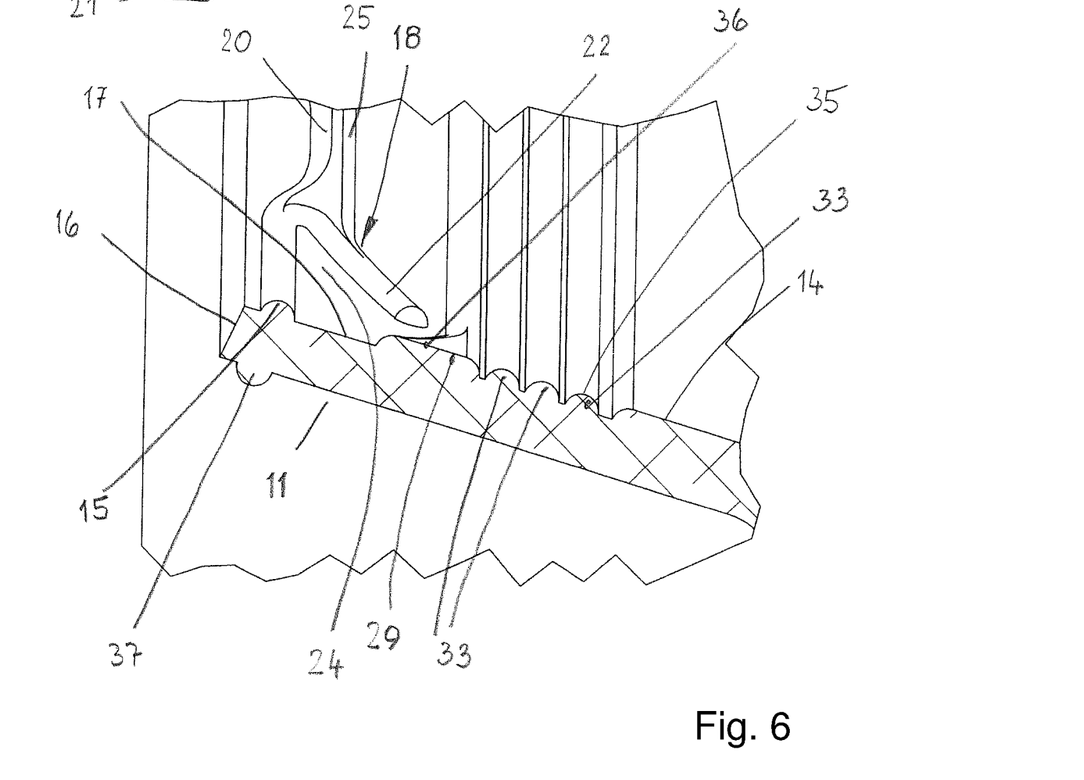
FIG. 6 is a detail view of the detail VI in FIG. 2.
Figure 8:
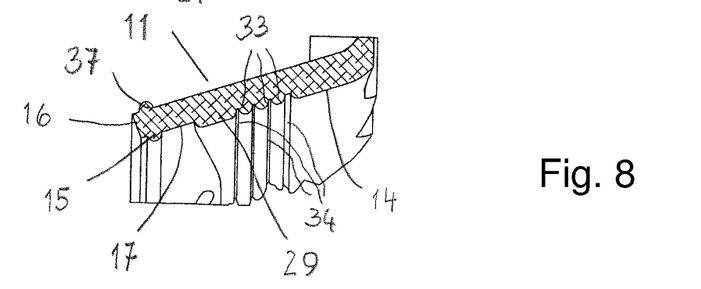
FIG. 8 is a section view along the section line VIII-VIII in FIG. 7.

A first circumferentially extending ring 15 is provided at the free rim at the inner side 14 of the sealing lip 11 and is formed by an approximately semi-circular elevation (viewed in axial section) at the inner side 14. This first circumferential ring 15 has minimal spacing from the end face 16 of the sealing lip 11 (FIGS. 6 and 8).

A wall surface 17 adjoins the first circumferential ring 15 at the side which is facing away from the end face 16 of the sealing lip 11; the wall surface 17 is provided with return conveying units 18 that ensure that medium (in general oil) which has leaked from the medium side 19 of the radial shaft seal ring underneath the sealing lip 11 is returned to the medium side 19.

Figures 4, 5:
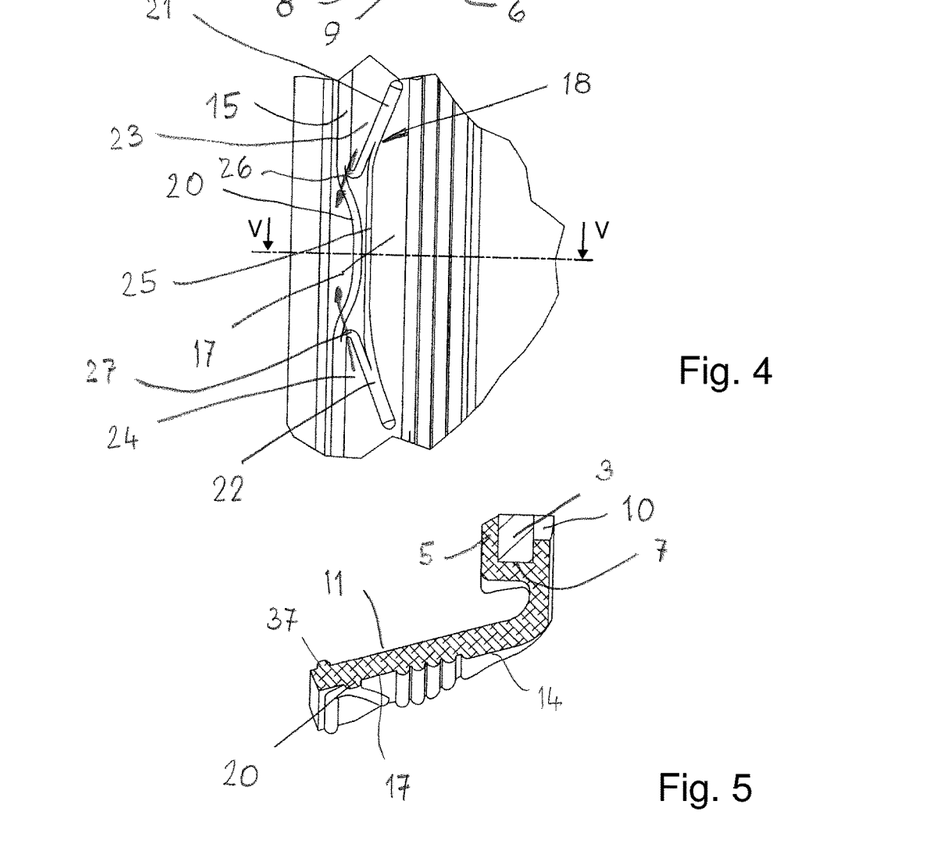
FIG. 4 is a detail illustration of the detail IV in FIG. 2.
FIG. 5 is a detail view of a section along the section line V-V in FIG. 4.

As can be seen in FIGS. 2 and 4, the ring 15 has sections 20 that are positioned at a spacing from each other and form sickle-shaped depressions; these depressions or sections 20 are curved in the axial direction toward the air side 13. The sections 20 are mirror symmetrical to the corresponding axial plane, as shown in FIG. 4. The sections 20 are monolithically formed together with the ring 15 but have a smaller axial width than the ring 15. In the embodiment, the sections 20 are approximate half as wide as the ring 15 (see FIG. 4).

The sections 20 can be continuously curved across their entire circumferential length. However, it is possible that the sections 20 have at half their length a straight center section. Depending on the configuration of the curved or arched sections 20, the return conveying quantity of the return conveying elements 18 can be influenced.

In the region in which the two ends of the sections 20 are passing into the ring 15, oppositely extending return conveying elements 21, 22 are provided that in the circumferential direction of the sealing lip 11 are extending at an angle to each other.

The sections 20 and the return conveying elements 21, 22 form the return conveying units 18.

The sections 20 and the return conveying elements 21, 22 like the ring 15 are formed by elevations which are projecting at the inner side 14 away from the wall surface 17. The return conveying elements 21, 22 are positioned at an acute angle relative to the neighboring regions of the ring 15 with which, in plan view according to FIG. 4, they delimit V-shaped pressure chambers 23, 24. They taper in circumferential direction in the direction toward the curved or arched section 20 extending between the two pressure chambers 23, 24. The return conveying elements 21, 22 pass with an arc-shaped curvature into the medium-side ring 15.

As shown in FIG. 4, the return conveying elements 21, 22 are connected to each other by a narrow rib 25. The rib 25 extends in circumferential direction and parallel to the medium-side ring 15. Advantageously, the rib 25 is formed monolithically together with the return conveying elements 21, 22.

The curved or arched section 20 is arranged such that at half the length it has the smallest spacing from the rib 25.

Distributed about the circumference of the sealing lip 11, the arched or curved sections 20 are uniformly distributed as shown in FIG. 2. The sections 20 are adjoined in the described way by the return conveying elements 21, 22 which delimit with the neighboring regions of the medium-side ring 15 the pressure chambers 23, 24. The rounded tips 26, 27 of the pressure chambers 23, 24 at both ends of the section 20 are oriented toward each other.

The return conveying unit 18 and the rib 25 form a return conveying device 28. Accordingly, about the circumference of the sealing lip 11 several such return conveying devices 28 are provided at a spacing behind each other.

Figure 7:
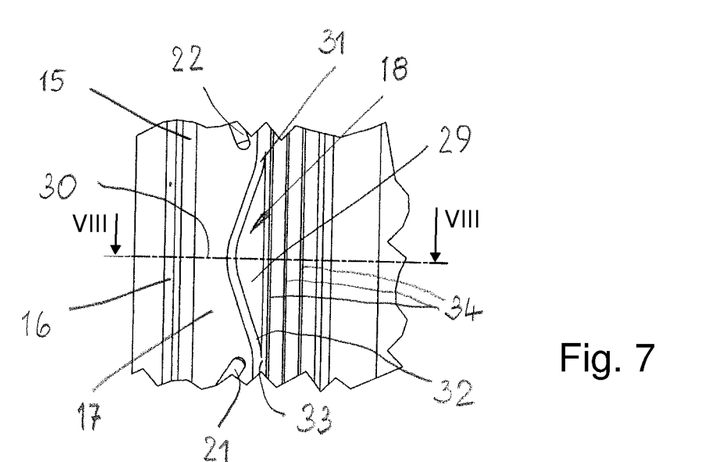
FIG. 7 is a detail view of the detail VII in FIG. 2.

In the region between neighboring return conveying devices 28, a raised guiding rib 29 is provided which is provided at the inner side 14 of the sealing lip 11 and advantageously has the same height as the medium-side ring 15. The guiding rib 29 extends in circumferential direction of the sealing lip 11 and widens in a direction away from its two ends. Advantageously, the guiding rib 29 is designed mirror symmetrical relative to its transverse center plane 30 (FIG. 7).

Across its length, the guiding rib 29 has a spacing relative to the medium-side ring 15. In accordance with the shape of the guiding rib 29, the spacing relative to the ring 15 at half the length is smallest while it is greatest in the region of the two ends positioned in circumferential direction.

The two ends 31, 32 are positioned approximately at the level of the free ends of the return conveying elements 21, 22 of the neighboring conveying units 18. The free ends of the return conveying elements 21, 22 have a minimal spacing relative to the ends 31, 32 of the guiding rib 29.

One such guiding rib 29 is arranged between two neighboring return conveying devices 28, respectively. It is formed by a projection of a ring 33 which is provided at the inner side 14 of the sealing lip 11 and extends coaxial to the medium-side ring 15, wherein the projection is pointing toward the ring 15. The return conveying devices 28 are arranged between the rings 15 and 33.

Advantageously, several such rings 33 are provided which are coaxial to each other and advantageously have a minimal axial spacing relative to each other. Between the rings 33, annular intermediate spaces 34 are thus formed which are coaxial to each other as well as to the medium-side ring 15 and advantageously have the same width. Of these rings 33, only the ring 33 neighboring the medium-side ring 15 is provided with the guiding ribs 29.

The rings 33 which are advantageously provided with a curved outer side 35 ensure the sealing function in the static state (when the shaft to be sealed is not rotating).

The rings 15 and 33, the return conveying units 18, and the guiding ribs 29 have preferably the same height (FIG. 6). In this way, it is ensured that the medium side 19 can be sealed reliably by the ring 15. Medium that may still have leaked through underneath the ring 15 is reliably returned by the return conveying devices 28 and the guiding ribs 29. The rings 33 which in the installed position are resting sealingly against the shaft prevent that air is sucked in from the air side 13.

In contrast to the rings 15 and 33, the guiding rib 29 has a flat end face 36.

Since the return conveying devices 28 and the guiding ribs 29, when projected onto the drawing plane (FIGS. 4 and 7), are symmetrical to the respective center plane 30, they function optimally in both rotational directions. The medium which leaks underneath the sealing lip 11 is thus returned—independent of the rotational direction of the shaft—reliably to the medium side 19.

The sections 20 to 22 as well as the rib 25 have across their length a constant axial width (FIG. 4), respectively. In this way, a uniform return conveyance of the medium in both rotational directions of the shaft results.

The height of the sections 20 can be constant. It is moreover possible to configure these sections 20 such that their height increases continuously from both ends so that the sections 20 have their greatest height at half their length.

The medium-side ring 15 has a minimal spacing from the end face 16 of the sealing rib 11 (see FIG. 8). In the installed position, the end face 16 is approximately positioned at a right angle to the top side of the shaft. Approximately at the level of the medium-side ring 15 at the top side of the sealing lip 11 a circumferentially extending projecting ring 37 is provided. It has advantageously a curved top side. In axial section (FIG. 6), the ring 37 is configured to be approximately semi-circular. The ring 37 can contribute to a stability increase of the sealing lip 11.

In the illustrated and described embodiment, the return conveying units 18 as well as the guiding rib 29 are embodied symmetrical to the transverse center plane 30. In principle, it is however also possible to configure the return conveying devices 28, in deviation from the illustrated preferred embodiment, to be asymmetric. Such a configuration is beneficial when the shaft to be sealed in use has a main rotational direction. In this case, the return conveying devices 28 and the guiding ribs 29 can be designed such that in this main rotational direction an optimal return conveying action is provided for the medium that has leaked through underneath the sealing lip 11. When the shaft is then rotating in the other direction, the return conveying action of the asymmetrically configured to return conveying devices 28 and guiding ribs 29 is sufficient in this case.

In order to minimize possibly occurring noise, for example, in operation at very high rotational speeds, the length of the return conveying elements 21, 22 can also be varied. The radial shaft seal ring is therefore distinguished in use by excellent low-noise properties. The radial shaft seal ring is moreover constructively simple in its configuration and can be produced in an inexpensive way.

It is furthermore possible to arrange the return conveying devices 28 in circumferential direction of the sealing lip 11 such that they adjoin each other immediately and do not have, as in the illustrated embodiment, a minimal circumferential spacing from each other.

Figure 4A:
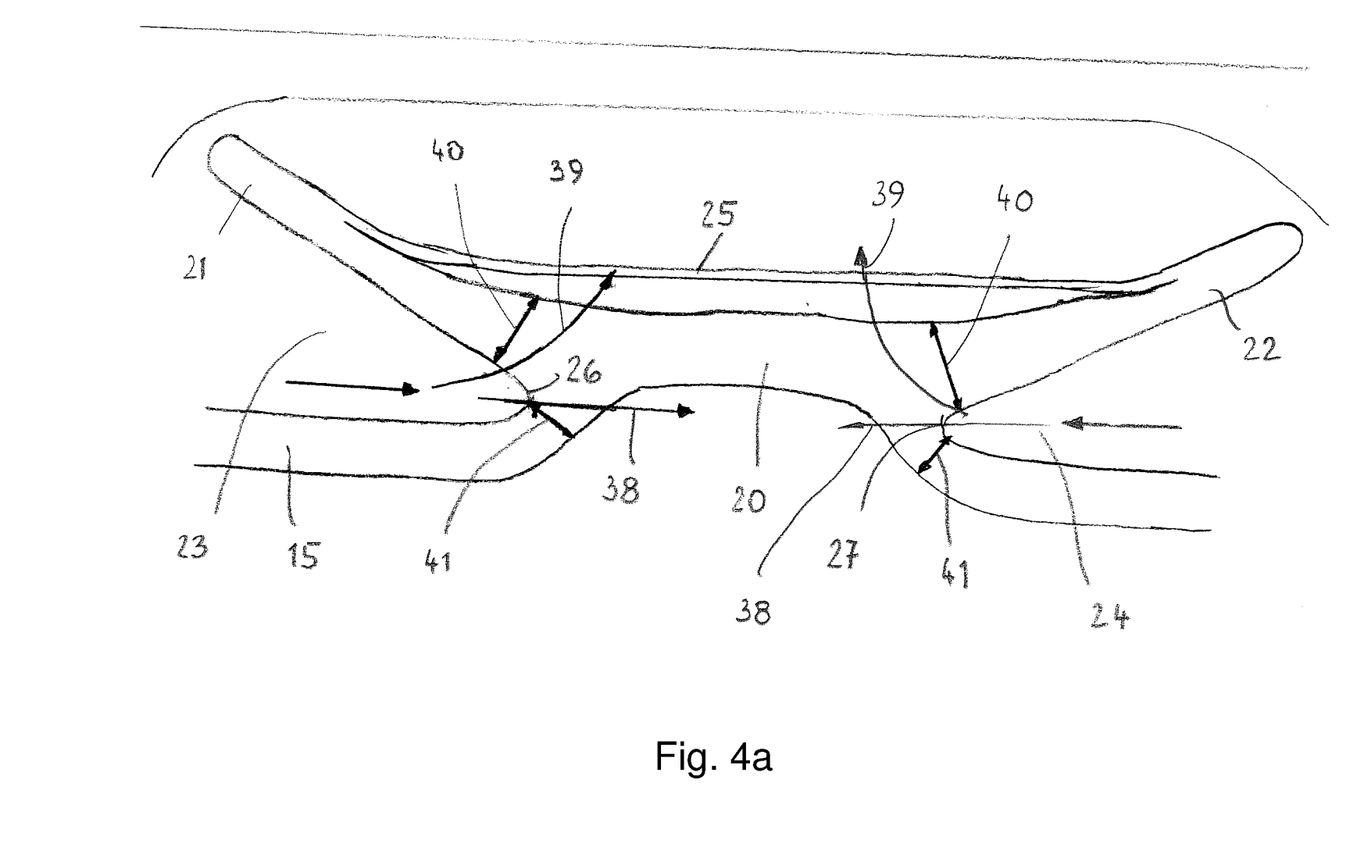
FIG. 4*a* shows an enlarged illustration of the course of the return conveyance and of the leakage flow.

In use of the radial shaft seal ring, a hydrodynamic flow in the direction of the arrows indicated in FIG. 4 is produced in the pressure chambers 23, 24 due to the medium to be sealed having leaked through underneath the ring 15. Since the pressure chambers 23, 24 taper in flow direction, a pressure is generated in the pressure chambers 23, 24 that causes the ring 15 in the region of these pressure chambers 23, 24 to briefly lift off the shaft so that the medium to be sealed can flow from the pressure chambers 23, 24 across the ring 15 and back to the medium side 19. FIG. 4a shows this return conveying action of the medium side 19 in the region of the pressure chambers 23, 24, illustrated by the flow arrows 38. The flow arrows 39 indicate the leakage flow (loss flow) toward the air side 13.

Due to the depression 20 the return conveyance of the medium (flow arrow 38) is not deflected or only deflected to a much lesser degree than the leakage flow (flow arrows 39). In comparison to conventional radial shaft seal rings, the leakage flow (arrows 39) can be significantly reduced as a result of the depression 20. The medium which is exiting from the medium chamber 19 passes due to the shaft rotation into the pressure chambers 23, 24 and is conveyed by means of the described return conveying devices 28 back to the medium side 19. The possibly occurring leakage flow 39 is kept at a minimum because the return conveyance (arrows 38) of the medium to the medium side 19 experiences no or only a very minimal flow change that is significantly smaller in comparison to that of the leakage flow (arrows 39).

Also, by widening the region 40 in comparison to the region 41 (FIG. 4a), it is possible to counteract the typical compression force distribution of concentric gaskets. This has the result that the leakage or loss flow (arrow 39) experiences a greater resistance than the return conveyance (flow arrow 38).

The widened portion 40 is provided at the transition from the return conveying elements 21, 22 into the depression 20. The widened portion 41 is located at the transition from the ring 15 into the depression 20. In regard to these two widened portions 40, 41, reference is expressly being had to FIG. 4a where these conditions are schematically illustrated.

The described radial shaft seal ring is characterized in that the sealing lip 11 at the medium-side rim is provided with a circumferentially extending ring 15 that comprises the sections 20 distributed uniformly about the circumference. They form so-called recesses oriented toward the air side 13. Similar to alternating-rotation elements, the return conveying elements, in the form of the sections 21, 22 are centrally arranged relative to these recesses (sections 20). The sections 20 open approximately tangentially into the ring 15.

The rear regions facing the air side 13 are provided with the rings 33 that serve for securing the static sealing action. At the ring 33 which is neighboring an d facing the medium-side ring 15, the guiding ribs 29 are provided which form the projections arranged in distribution about the circumference. The number of these projections 29 corresponds to the number of depressions 20. The depressions 20 and the projections 29 are provided alternatingly in the circumferential direction.

The projections 29 in the form of the guiding ribs ensure that the medium volume in the form of leakage flow (arrow 39), which has not been returned by the return conveying elements 21, 22, is actively guided to the neighboring return conveying element. Due to this additional active conveying action of the medium volume to the return conveying elements, the return conveyance into the medium chamber is improved.

The medium-side ring 15 with the depressions 20 reduces the disruption of the flow direction of the medium to be sealed. Due to the inertia of the medium, the leakage (loss) flow is reduced. This is achieved inter alia in that the most narrow gap of the dual-convergent gap that is formed by the pressure chambers 23, 24, viewed in radial direction, is positioned at the medium side 19.

Moreover, the contact surface in the region of the calculated leakage (loss) flow is enlarged. In this way, it is made more difficult for a possibly present leaked medium to move across the return conveying elements in the direction toward the air side 13.

The projections in the form of the guiding ribs 29, provided at the ring 33 neighboring and facing the ring 15, guide possible leakage or loss flows in a targeted and active way back to the return conveying elements 21, 22.

The radial shaft sealing ring can be used in all fast rotating applications and alternating rotational directions of a shaft. The shaft to be sealed can have high rotational speeds as well as corresponding high circumferential speeds. Alternating rotational directions between the medium side 19 and the air side 13 are reliably sealed. A main field of application can be, for example, in electric vehicles for sealing a gear box input shaft.

In deviation from the illustrated embodiment, the radial shaft seal can also be configured such that it is integrated into a sealing flange, for example. In this case, the radial shaft seal requires no housing. For example, the sealing lip can be glued to the sealing flange, vulcanized thereto or connected in any other suitable way.

The specification incorporates by reference the entire disclosure of German priority document 10 2017 012 166.4 having a filing date of Dec. 22, 2017.

While specific embodiments of the invention have been shown and described in detail to illustrate the inventive principles, it will be understood that the invention may be embodied otherwise without departing from such principles.

What is claimed is:

1. A radial shaft seal comprising:
   at least one sealing lip of elastomeric material comprising an inner side facing a shaft to be sealed;
   the at least one sealing lip comprising a first circumferential ring extending in a circumferential direction of the at least one sealing lip and arranged at the inner side, wherein the first circumferential ring is configured to rest seal-tightly against the shaft and configured to seal a medium side relative to an air side;
   the at least one sealing lip further comprising return conveying elements arranged about the circumference of the at least one sealing lip at the inner side, wherein the return conveying elements are arranged at a side of the first circumferential ring facing the air side and configured to return leaked medium, independent of a rotational direction of the shaft, to the medium side;
   at least one second circumferential ring arranged at the inner side and positioned at a side of the return conveying elements facing the air side;
   wherein the first circumferential ring is an elevation of the inner side and is comprised of depressions and of straight sections, wherein the straight sections extend in the circumferential direction parallel to the circumferential direction and are spaced apart from each other in the circumferential direction, wherein the straight sections connect the depressions to each other, wherein the depressions are distributed about a circumference of the first circumferential ring and formed as elevations of the inner side, wherein the depressions are curved at least partially along a length thereof and extend away from the straight sections in an axial direction toward the air side and toward the at least one second circumferential ring so as to form axial recesses of the first circumferential ring;
   wherein each depression is positioned, respectively, between two of the return conveying elements that are neighboring each other and that are oppositely slanted relative to each other in the circumferential direction;
   wherein each depression has opposed ends connected to a facing end of the straight sections connected to each depression, respectively, and wherein said two return conveying elements neighboring each other have first ends connected to the facing ends of the straight sections connected to each depression, respectively, so as to form pressure chambers between said two return conveying elements and the straight sections, respectively.

2. The radial shaft seal according to claim 1, wherein the depressions adjoin approximately tangentially the first circumferential ring.

3. The radial shaft seal according to claim 1, wherein the return conveying elements are in themselves straight or curved.

4. The radial shaft seal according to claim 1, wherein the return conveying elements and the first circumferential ring are monolithically formed together.

5. The radial shaft seal according to claim 1, wherein the pressure chambers are arranged relative to each other such that the pressure chambers taper in a direction toward each other.

6. The radial shaft seal according to claim 1, wherein the return conveying elements have a spacing relative to the at least one second circumferential ring.

7. The radial shaft seal according to claim 1, wherein the return conveying elements all have the same length.

8. The radial shaft seal according to claim 1, wherein the return conveying elements have different lengths among each other.

9. The radial shaft seal according to claim 1, wherein a plurality of said at least one second circumferential ring are provided and are arranged coaxial to each other and coaxial to the first circumferential ring.

10. The radial shaft seal according to claim 9, wherein the second circumferential rings are identically embodied.

11. The radial shaft seal according to claim 1, wherein the at least one second circumferential ring, viewed in an axial section, has a curved outer side.

12. The radial shaft seal according to claim 11, wherein a plurality of said at least one second circumferential ring are provided and are arranged at a same spacing relative to each one behind the other.

13. The radial shaft seal according to claim 1, wherein the at least one second circumferential ring neighboring the first circumferential ring comprises projections distributed about a circumference of the at least one second circumferential ring, wherein the projections extend in the axial direction toward the first circumferential ring.

14. The radial shaft seal according to claim 13, wherein the projections and the depressions are arranged alternatingly in the circumferential direction of the at least one sealing lip.

15. The radial shaft seal according to claim 13, wherein second ends of the return conveying elements have a minimal spacing relative to the projections.

16. A radial shaft seal comprising:

at least one sealing lip of elastomeric material comprising an inner side facing a shaft to be sealed;

the at least one sealing lip comprising a first circumferential ring extending in a circumferential direction of the at least one sealing lip and arranged at the inner side, wherein the first circumferential ring is configured to rest seal-tightly against the shaft and configured to seal a medium side relative to an air side;

the at least one sealing lip further comprising return conveying elements arranged about the circumference of the at least one sealing lip at the inner side, wherein the return conveying elements are arranged at a side of the first circumferential ring facing the air side and configured to return leaked medium, independent of a rotational direction of the shaft, to the medium side;

at least one second circumferential ring arranged at the inner side and positioned at a side of the return conveying elements facing the air side;

wherein the first circumferential ring is an elevation of the inner side and is comprised of depressions and of straight sections, wherein the straight sections extend in the circumferential direction parallel to the circumferential direction and are spaced apart from each other in the circumferential direction, wherein the straight sections connect the depressions to each other, wherein the depressions are distributed about a circumference of the first circumferential ring and formed as elevations of the inner side, wherein the depressions are curved at least partially along a length thereof and extend away from the straight sections in an axial direction toward the air side and toward the at least one second circumferential ring so as to form axial recesses of the first circumferential ring;

wherein each depression is positioned, respectively, between two of the return conveying elements that are neighboring each other and are oppositely slanted relative to each other in the circumferential direction;

wherein each depression has opposed ends connected to a facing end of the straight sections connected to each depression, respectively;

wherein said two return conveying elements neighboring each other have first ends connected to the facing ends of the straight sections connected to each depression, respectively, so as to extend at an acute angle relative to the respective straight section to which the first end is connected, respectively, and so as to form pressure chambers between said two return conveying elements and the straight sections connected to each depression, respectively;

wherein the pressure chambers taper toward each other and are configured to create a return conveying action in use of the radial shaft seal by pressure generation in the pressure chambers to briefly lift off the first circumferential ring and return medium to the medium side.

17. A radial shaft seal comprising:

at least one sealing lip of elastomeric material comprising an inner side facing a shaft to be sealed;

the at least one sealing lip comprising a first circumferential ring extending in a circumferential direction of the at least one sealing lip and arranged at the inner side, wherein the first circumferential ring is configured to rest seal-tightly against the shaft and configured to seal a medium side relative to an air side;

the at least one sealing lip further comprising return conveying elements arranged about the circumference of the at least one sealing lip at the inner side, wherein the return conveying elements are arranged at a side of the first circumferential ring facing the air side and configured to return leaked medium, independent of a rotational direction of the shaft, to the medium side;

at least one second circumferential ring arranged at the inner side and positioned at a side of the return conveying elements facing the air side;

wherein the first circumferential ring is an elevation of the inner side and is comprised of depressions and of straight sections, wherein the straight sections extend in the circumferential direction parallel to the circumferential direction and are spaced apart from each other in the circumferential direction, wherein the straight sections connect the depressions to each other, wherein the depressions are distributed about a circumference of the first circumferential ring and formed as elevations of the inner side, wherein the depressions are sickle-shaped and extend away from the straight sections in an axial direction toward the air side and toward the at least one second circumferential ring so as to form axial recesses of the first circumferential ring;

wherein each depression is positioned, respectively, between two of the return conveying elements that are neighboring each other and that are oppositely slanted relative to each other in the circumferential direction;

wherein each depression has opposed ends connected to a facing end of the straight sections connected to each depression, respectively, and wherein said two return conveying elements neighboring each other have first ends connected to the facing ends of the straight sections connected to each depression, respectively, so as to form pressure chambers between said two return conveying elements and the straight sections, respectively;

wherein the depressions have an axial width that is smaller than an axial width of the straight sections.

* * * * *